Dec. 2, 1924.
D. H. YOUNG
1,517,482
PINTLE LINK CHAIN
Filed Oct. 31, 1923
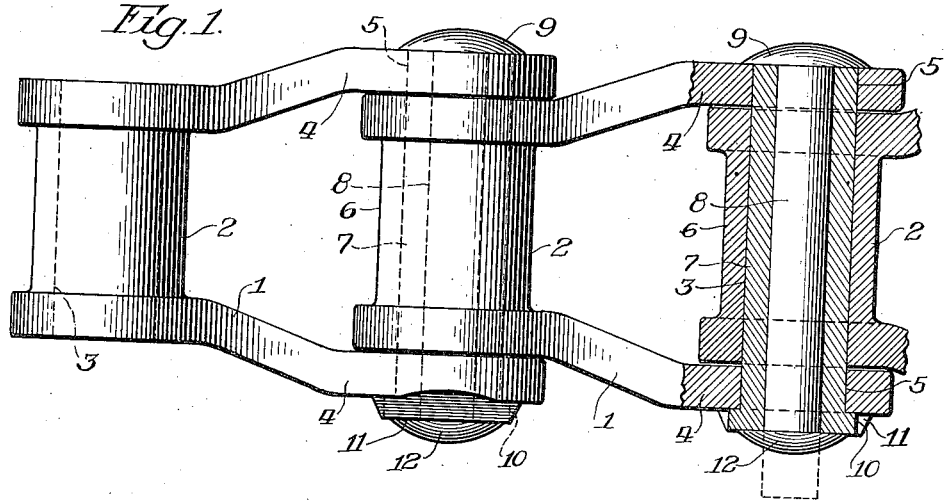
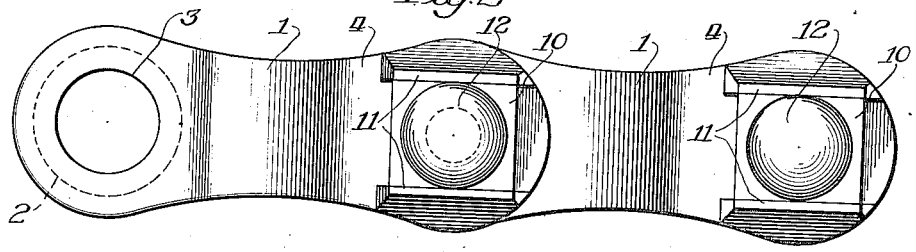
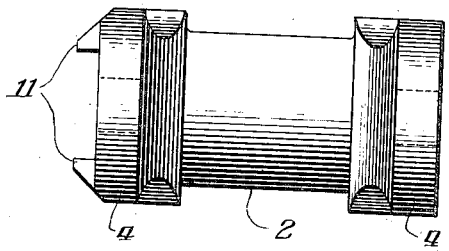
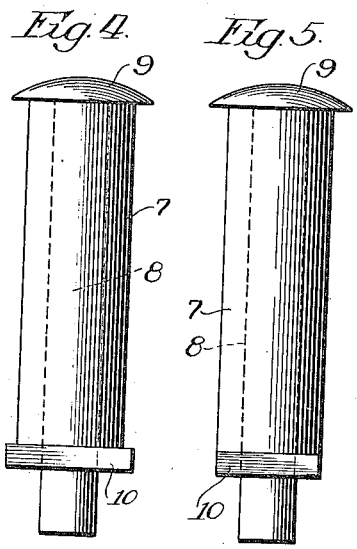
Witness:
Inventor:
Donald H. Young.
By Wilkinson Huxley Byron & Knight
Atty.

Patented Dec. 2, 1924.

1,517,482

UNITED STATES PATENT OFFICE.

DONALD H. YOUNG, OF BERKELEY, CALIFORNIA, ASSIGNOR TO AMERICAN MANGANESE STEEL COMPANY, OF CHICAGO, ILLINOIS, A CORPORATION OF MAINE.

PINTLE-LINK CHAIN.

Application filed October 31, 1923. Serial No. 671,821.

*To all whom it may concern:*

Be it known that I, DONALD H. YOUNG, a citizen of the United States, residing at Berkeley, in the county of Alameda and State of California, have invented certain new and useful Improvements in Pintle-Link Chains, of which the following is a specification.

This invention relates to chains, the links of which are articulated by passing pintles through and securing them in the lapped ends of adjacent links, and particularly to the novel construction of pintle employed in such chains.

One object of the invention is to provide a construction of pintle which may be more firmly and permanently secured in position in the chain than pintles heretofore employed, and without opposing the free hinging action of the joint between the links. Accordingly, one feature of the invention consists in constructing the pintle of outer and inner concentric members in the form, respectively, of a tubular part which constitutes the bearing member in the overlapped spaced ends of a link as well as in the portion of the adjacent link lying between the same, and a pin fitted in this tubular part and having its end headed upon the ends of the tubular part in a manner to prevent withdrawal of the pin from the tube, and to hold the composite pintle in the links as well; the axial dimension of the tube being such that the pin may be riveted down firmly upon the tube without binding the sides of the links or interfering with the free action of the hinge.

The preferred method of establishing the described relation of the pin to the tube and of the resulting composite pintle to the links which it articulates, is to first form a head upon one end of each of the telescoping parts of the pintle, leaving one end of the tube free for insertion through the links, and one end of the pin free for introduction into the tube, then insert the parts in opposite directions until the prepared head of the pin abuts against the inserted end of the tube, being of a radial dimension that causes it to project beyond the latter sufficiently to overlap the side of the link, and then upset the inserted and now protruding end of the pin upon the prepared head of the tube so that the links are confined between two heads, one of which is formed upon the pin and the other upon the tube, and the spacing of which is definitely determined by the length of the tube, with such resistance to compression as to permit the riveting to proceed to a firm seating without pressing the overlapping ends of the links upon the intermediate end of the adjacent link.

Another object of the invention is to provide a chain pintle of increased strength and wearing capacity, and to this end, another feature of the invention consists in making a composite pintle having the features of structure and design above described, and in which the tubular member is composed of special steel, such, for instance, as manganese steel of high resistance to the wear of the links bearing thereon, as well as high resistance to compression under the riveting action to which the pin is subjected, while the pin is made of a steel which is more readily manipulated for preparing its original head and for riveting it against the head of the tubular member of the pintle.

In the accompanying drawing, in which the preferred embodiment of the invention is shown by way of illustration—

Figure 1 is a plan view of a portion of a chain embodying the several features of the invention, the form of the inserted end of one of the pin members prior to being headed being shown in dotted lines.

Figure 2 is a side elevation of the parts shown in Figure 1.

Figure 3 shows in end elevation the right-hand end of Figure 2; and

Figures 4 and 5 are elevations of the composite pintle viewed at right angles to each other, and showing the inserted end of the rivet in its original condition.

The numeral 1 represents links, each composed of side members united at one end of the link by an integral hub 2 provided with a bore 3 to receive the pintle, but having the arms 4 of said side members at the opposite end of the link spaced apart sufficiently to lap outside of the hub portion 2 of an adjacent link, and constructed with openings 5 which adapt said arms to receive the composite pintle 6 and support it in position to serve as a bearing for said hub portion. As thus far described, the construction, design, and assembly of the links may follow known practice.

According to the present invention, the pintle 6 is of composite construction, in that it consists of an outer tubular member 7 and an inner pin or elongated rivet 8, and these parts are so designed that the tubular member 7 will project beyond the hub 2 of a link sufficiently to extend through the spaced arms 4 and be supported therein, while the pin 8 will extend beyond the ends of the tubular member sufficiently to be headed against ends and not only prevent withdrawal of the pin from the tube, but confine the composite pintle in the links without crowding the heads of the pintle against the links or otherwise interfering with the free hinging action of the joint. One of the confining heads of the pintle, namely, the head 9, is formed on the rivet 8, while the other, 10, is formed on the tube 7. Head 10 is proportioned to fit between the lugs 11 formed on the outer face of the link which receives said head, thus preventing the tube from rotating in the outer links where the area of bearing is restricted. The head 9 is of sufficient diameter to extend beyond the end of the tube and overlie the side of the link member, and in this way leaves the inserted end of the tube intact and renders the body of the tube available as a spacing means between the heads in order to avoid crowding the link members, as stated. Heads 9 and 10 are, of course, formed upon the respective members of the composite pintle prior to assembly, and the pintle is completed by upsetting the head 12 upon the inserted end of the rivet after assembly. But the head 12 is formed against the existing head 10 of the tube, and so prevents shortening of the pintle or crowding of the links even though the assembly be completed by the mere use of hand tools in the field. Inasmuch as the rivet 8 is headed down upon the ends of the tube 7, it follows that the rivet will not turn in the tube, and since the tube is held against turning by the lugs 11 there will be no tendency to wear off the marginal portion of the head 9 against the link 4. Thus, the composite pintle comprises a pair of headed members, each with one end left free for insertion, and assembled by inserting them in opposite directions and upsetting the inserted end of the rivet member upon the head of the tubular member.

An important advantage arising from the production of the pintle in composite form, as described, is that it permits the outer or wearing member to be made of material, such as manganese steel, which is especially adapted for use as a hinge pintle, as well as to resist upsetting or foreshortening of the length of the pintle under the riveting action, while the pin may be made of material better adapted to withstand the riveting action.

I claim:

1. In lap link chains, the combination of a plurality of links having their ends overlapped and perforated to receive a pintle, and a composite pintle comprising a tubular part extending through all of the overlapped members and having a head for arresting it in one direction, and a rivet extending through said tubular part and having a head overlying the inserted end of the tubular part and a portion of the surrounding link member, and also headed against the head of the tubular part.

2. In lap link chains, the combination of a plurality of links having their ends overlapped and perforated to receive a pintle, and a composite pintle comprising a tubular part extending through all of the lapped portions of the links, having a head through which it engages the outermost link portion at one end of the pintle, and having its inserted end presented at the outer face of the outermost link member at the other end, and a rivet introduced into said tubular part from the inserted end of the latter, having a head which abuts against the inserted end of the tubular part and extends beyond the same in position to engage the adjacent link member, and having its inserted end upset against the head of the tubular part.

3. In lap link chains, the combination of a plurality of links each comprising side members joined at one end of the link by an integral hub and spaced apart at the other end of the link to receive the hub of the next link between them; the spaced ends and the intervening hub being provided with bores to receive pintles for articulating the links; and composite pintles comprising tubular parts extending through the spaced ends and intervening hubs, and pins extending through the tubular parts and headed upon the ends thereof; the tube having a head overlying a link, and said link having means for engaging the head to prevent the tube from turning; and the heading of the pin against the ends of the tube preventing the pin from turning in the tube.

4. A composite pintle for lap link chain joints, constructed with oppositely acting heads for resisting its displacement from the links, and comprising a tubular outer member extending the full distance between the heads, adapted to bear in all of the overlapping link members of the joint, and carrying one of the pintle heads, and a pin adapted to pass through the tubular member, carrying one of the pintle heads, and thereby arrested against the inserted end of the tubular member and having an inserted end adapted to be riveted against the head which is carried by the tubular member.

Signed at Berkeley, California, this 10th day of October, 1923.

DONALD H. YOUNG.